(12) United States Patent
Ding et al.

(10) Patent No.: US 8,065,319 B2
(45) Date of Patent: Nov. 22, 2011

(54) RUNTIME SEMANTIC QUERY OPTIMIZATION FOR EVENT STREAM PROCESSING

(75) Inventors: Luping Ding, Worcester, MA (US);
Songting Chen, San Jose, CA (US);
Elke A Rundensteiner, Worcester, MA (US); Junichi Tatemura, Sunnyvale, CA (US); Wang-Pin Hsiung, Santa Clara, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 350 days.

(21) Appl. No.: 11/950,719

(22) Filed: Dec. 5, 2007

(65) Prior Publication Data

US 2009/0006320 A1 Jan. 1, 2009

Related U.S. Application Data

(60) Provisional application No. 60/909,470, filed on Apr. 1, 2007.

(51) Int. Cl.
*G06F 7/00* (2006.01)
*G06F 17/00* (2006.01)

(52) U.S. Cl. ........... 707/769; 707/999.006; 707/999.003

(58) Field of Classification Search ................ 707/1, 769
See application file for complete search history.

(56) References Cited

U.S. PATENT DOCUMENTS

| | | | |
|---|---|---|---|
| 5,742,806 A | 4/1998 | Reiner | |
| 5,956,706 A | 9/1999 | Carey | |
| 6,338,055 B1 * | 1/2002 | Hagmann et al. | 707/2 |
| 7,177,859 B2 | 2/2007 | Pather | |
| 7,457,728 B2 * | 11/2008 | Chen et al. | 702/189 |

OTHER PUBLICATIONS

Adi et al, "Amit-the situation manager," VLDB Journal, 13(2):177-203, 2004.
Aguilera et al, "Matching events in a content-based subscription system," PODC, pp. 53-61, 1999.
Chakravarthy et al, "Composite events for active data bases: Semantics, contexts and detection", VLDB, pp. 606-617, 1994.
Demers. et a;, "A general purpose event monitoring system," CIDR, 2007.
Wu et al, "High performance complex event processing over streams," SIGMOD, pp. 407-418, 2006.
Complex Event Processing, Web page from www.complexevents.com 2007.

* cited by examiner

*Primary Examiner* — Tony Mahmoudi
*Assistant Examiner* — Paul Kim
(74) *Attorney, Agent, or Firm* — Joseph Kolodka; Bao Tran

(57) ABSTRACT

Systems and method are disclosed for applying a query to an event stream by storing one or more event constraints; performing constraint aware complex event processing on the query and the event constraints; and optimizing the query at run time.

20 Claims, 11 Drawing Sheets $$T1: \frac{\neg(E_i[h_e] < E_j[h_e]) \; , \; E_j[h_p]}{\neg E_i[\overline{h_p}]}$$

$$O1: \frac{f_1^o \vee \neg E_i[h_e] \; , \; f_2^o \vee E_i[h_e]}{f_1^o \vee f_2^o}$$

$$O2: \frac{f_1^o \vee \neg E_i[h_e] \; , \; f_2^o \vee E_i[h_p]}{f_1^o \vee f_2^o}$$

$$O3: \frac{f_1^o \vee E_i[h_e] \; , \; f_2^o \vee \neg E_i[\overline{h_p}] \; , \; \neg E_i[h_p]}{f_1^o \vee f_2^o}$$

FIG. 7

Q: SEQ(E1, AND(OR(SEQ(E2,E3), SEQ(E4,E5)), SEQ(E2,E6)), OR(E7,SEQ(E8,E9),E9))

G(Q):

$C_1$: E2→E3  $C_2$: E4→E5  $C_3$: E7  $C_4$: E8→E9  $C_5$: E9

$C_6$: E1→AND$^s$ → ($C_1 \vee C_2$) → AND$^e$ → ($C_3 \vee C_4 \vee C_5$)
       E2→E6

RUNTIME SEMANTIC QUERY OPTIMIZATION FOR EVENT STREAM PROCESSING

The present application claims priority to Provisional Application Ser. No. 60/909,470, filed Apr. 1, 2007, the content of which is incorporated by reference.

The present invention relates to optimization of complex event processing.

BACKGROUND

As automated business processes, such as Web services and online transactions, become ubiquitous, unprecedented volumes of business events are continuously generated and recorded as event streams. Complex Event Processing (CEP), which aims to detect interesting event patterns in event streams, is gaining adoption by enterprises for quick detection and reaction to critical business situations. Common CEP applications include business activity monitoring, supply chain management, and anomaly detection. Major database vendors have recently taken significant efforts in building event-driven architectures.

The event patterns in CEP specify complex temporal and logical relationships among events. Consider the example event pattern EP1 below, in which "->" represents the temporal relationship between two events and [totalPrice>200] is the predicate on the GenerateQuote event. This pattern monitors the cancelled orders that involve the participation of both suppliers and remote stocks, with quote's price>$200. Frequent occurrences of such patterns may indicate, e.g., the need for an immediate inventory management.

Event Pattern EP1:
((OrderFromSupplier->GenerateQuote[totalPrice>200])^ (UseRemoteStock->GenerateInvoice))->CancelOrder State-of-the-art CEP systems employ automata for event pattern matching. When there are large numbers of concurrent business processes, many partial query matches may be kept in automata states. Events arriving later need to be evaluated against all these partial matches to produce query results. Also, event streams tend to be high-speed and potentially infinite. To provide real-time responses, as often required by applications to take prompt actions, serious challenges in CPU/memory utilizations are faced by CEP.

One important class of event queries is called alert queries. Alert queries correspond to key tasks in business activity monitoring, including detection of shoplifting, or large/suspicious financial transactions, or other undue business actions like orders cancelled for certain reasons (see example above). These queries detect exceptional cases to the normal business flows and are thus expected to be highly selective. Keeping large numbers of partial matches that do not lead to any query results can cause a major drain on available system resources.

Typically, many business events do not occur randomly. Instead they follow pre-defined business logic or rules, such as a workflow model. Such CEP applications include Business activity monitoring: an online retailer may want to detect the anomalies from its order processing transactions. In this case, the events are generated from a BPEL workflow engine, a business rule engine or simply a customized program.

Manufacturing monitoring: a manufacturer may want to monitor its stream-line production process. The process events correspond to pre-defined procedures.

ClickStream analysis: a shopping website may want to monitor the click stream to discover the user navigation pattern. Here the user click events depend on how the website is structured.

As consequence, various constraints may exist among events in these CEP applications. In particular, occurrence constraints, such as mutually exclusive events, and order constraints, such as one event must occur prior to the other event, can be observed in all the applications listed above. The majority of the software design patterns exhibit such constraints as well.

The availability of these constraints enables us to predict the non-occurrences of future events from the observed events. Such predictions would help identify which partial query matches will not lead to final results. Further efforts in maintaining and evaluating these partial matches can be prevented. Example below illustrates such optimization opportunities that remain unexplored.

Example 1 Assume the event stream is generated by the online order transactions that follow the workflow in FIG. 1. Each task in the workflow, if performed, submits an event to the event stream. Both occurrence and order constraints can be inferred from this workflow. For example, the UseLocalStock and the UseRemoteStock events are mutually exclusive. Also, any GenerateQuote event, if it occurs, must be before the SendQuote event in a transaction.

Consider the example event pattern EP1 again. By exploiting the event constraints, whenever a UseLocalStock event occurs, this transaction is guaranteed to not match the query because the UseRemoteStock event will never occur in this transaction. Also, once a SendQuote event is seen in a transaction, and no GenerateQuote event with totalPrice>200 has been observed so far, the transaction will not match the query because no GenerateQuote event will happen after the SendQuote event. In either case, any partial matches by these transactions need not be maintained and evaluated further as they are guaranteed to never lead to a final result. If the query processing of large numbers of transactions could be terminated early, a significant amount of CPU and memory resources would be saved.

Several observations can be made from the above example. First, although the event constraints are known at query compilation time, the real optimization opportunities only emerge at runtime, based on the partial workflow executed so far (i.e., what events have been observed). For example, although the UseLocalStock and the UseRemoteStock events are known to be exclusive, only when one of them occurs, the other one will not be seen in the same transaction. Second, both occurrence and order constraints can be exploited to short-cut query execution.

As event processing gains popularity in many applications, an increasing effort has been devoted in developing efficient event processing systems. The existing work include streaming databases such as HiFi that support SQL-style queries, pub/sub systems that support simple filtering queries, and CEP systems such as SNOOP, Amit, CEDR, Cayuga and SASE, that support event pattern queries expressed by more powerful languages. These works focus on query model/language design and query algebra development. None of these works considers exploiting the common event constraints.

Semantic query optimization (SQO), i.e., using schema knowledge to optimize queries, has been extensively studied for traditional databases. Major techniques focus on optimizing value-based filtering or matching operations, including join and predicate elimination and introduction. They remain applicable in CEP for identifying efficient query plans at compilation time. These existing SQO techniques are mainly designed for static query optimization. They are inappropriate for runtime use. SQO has also been studied for optimizing queries over streaming XML documents. In CEP, event data from possibly thousands or millions of concurrent processes can be interleaved, and thus huge numbers of potential partial matches (one for each process) at runtime. Also, more types of constraints can be observed in business processes than in XML schema. All these pose stringent requirements on scalability, generality and extensibility on exploiting constraints in CEP. The work is also related to punctuation. The existing works on punctuation mainly focus on utilizing punctuations to reduce the memory usage of SQL-type of stream query. Punctuations (effective dynamic constraints) from event constraints are used to reduce both CPU and memory cost for CEP queries.

Other related areas include workflow management since the event constraints are extracted from the workflows. The existing work on workflow management focuses on two problems, workflow analysis and workflow verification. Workflow analysis involves the soundness proof of a workflow and the identification of critical activities in a workflow. Workflow verification deals with the following problem. Given a finite set S of dependencies, check whether there is a workflow execution (or all executions) satisfying all the dependencies in S. The exploitation of the order constraints relates to the work on temporal reasoning, i.e., to detect whether a cycle exists among the order constraints in query and in event data. However, the existing works on temporal reasoning focus on the language specification and enforcement instead of utilizing temporal constraints to optimize queries.

SUMMARY

Systems and method are disclosed for applying a query to an event stream by storing one or more event constraints; performing constraint aware complex event processing on the query and the event constraints; and optimizing the query at run time.

Implementations of the above systems and methods may include one or more of the following. The system can check for static query unsatisfiability (SunSAT) and/or check for runtime query unsatisfiability (RunSAT). Unsatisfiable partial query matches can be identified at runtime. The RunSAT considers the event query, the partial event history and the event constraints such as workflows. The RunSAT performance can be improved by applying a general pre-processing mechanism to pre-compute query failure conditions. The system can pre-processing the query with abductive inference. Common event constraints can be applied to allow constant time RunSAT. The system can augment event queries with pre-computed failure conditions. The system can also augment the query with Event-Condition-Action rules encoding the pre-computed failure conditions. An event instance can be discarded if a query instance has failed. The system can discard an event instance and rejecting a query instance if the event instance causes a global failure condition.

Advantages of the preferred embodiments may include one or more of the following. In addition to specifying and verifying business processes, such as workflow analysis and formal process verification, process instances, which can be seen as data, are considered in optimizing the semantic query. The system uses event instance partitioning and predicate pushdown. Schema knowledge is exploited in processing the CEP. The system keeps the relational and the object-oriented data models unordered, thus allowing temporal relationships to be specified among data. The system uses temporal event constraints to provide scalability, generality and extensibility in exploiting constraints in CEP and optimizing CEP over large volumes of business transaction streams. Reasoning using occurrence and order constraints enables the prediction the non-occurrences of certain future events, thereby allowing the system to identify long running query processes that are guaranteed to not lead to successful matches for termination. Since the optimization opportunities arise at runtime, the system provides runtime query unsatisfiability (RunSAT) checking to detect optimal points for terminating query evaluation. To assure efficiency of RunSAT checking, the system precomputes the query failure conditions to be checked at runtime. This guarantees a constant-time RunSAT reasoning cost, making the system highly scalable. The optimal query termination strategies can be done by augmenting the query with Event-Condition-Action rules encoding the pre-computed failure conditions. This results in an event processing solution compatible with state-of-the-art CEP architectures. Extensive experimental results demonstrate that significant performance gains are achieved, while the optimization overhead is small. The system handles complex patterns in event streams to allow modern enterprises to react quickly to critical situations.

BRIEF DESCRIPTION OF THE DRAWINGS

FIG. 7 depicts the resolution rules for constraints with scopes.

FIG. 8 depicts an example for a disjunctive event query.

FIG. 9 shows an exemplary automaton for the query of FIG. 5.

DESCRIPTION

Figure 2:
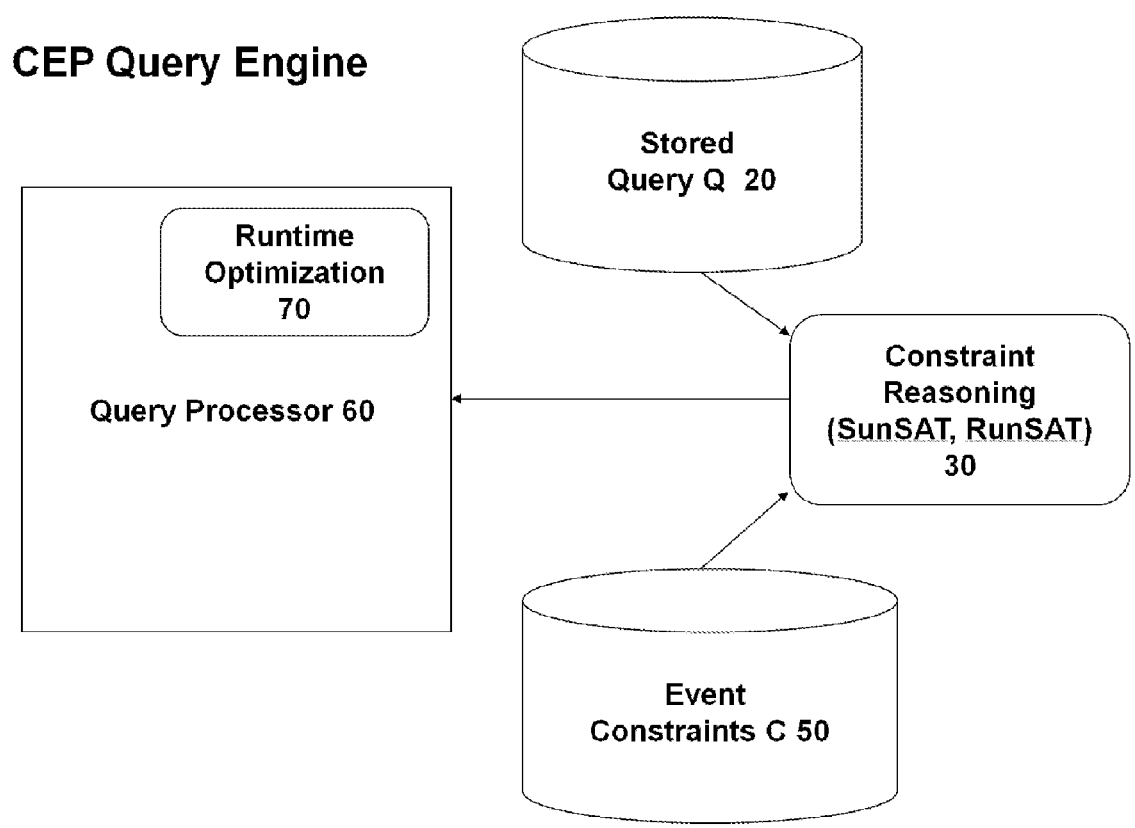
FIG. 2 shows an exemplary CEP query engine.

FIG. 2 shows an exemplary CEP query engine. In this engine, a database 20 stores query Q. The database 20 communicates with a constraint reasoning engine 30 which can check for static query unsatisfiability (SunSAT) or runtime query unsatisfiability (RunSAT). An event constraint engine 50 stores constraints C and the engine 50 also communicates with the constraint reasoning or constraint processor 30. The output of the constraint reasoning engine or constraint processor 30 is provided to a query processor 60 with a runtime optimizer 70.

The system of FIG. 2 exploits constraints for CEP by identifying unsatisfiable partial query matches at runtime. In addition, there may be thousands or even millions of concurrent business processes. To assure the efficiency and scalability, the runtime reasoning for each individual transaction must be lightweight. Otherwise, the overhead of constraint reasoning may outweigh its benefits. The system addresses the above challenges for constraint-aware CEP (C-CEP) by:

1. using a polynomial time, sound and complete runtime query unsatisfiability (RunSAT) checking algorithm for detecting the unsatisfiable query matches. This algorithm is based on a formal logic reasoning considering the event query, the partial event history and the event constraints such as workflows.

2. To improve the RunSAT performance, applying a general pre-processing mechanism (based on abductive inference) to pre-compute query failure conditions. A set of simple yet common event constraints allow constant time RunSAT.

3. augmenting event queries with pre-computed failure conditions. This facilitates the integration of the system into state-of-the-art CEP architectures.

The system of FIG. 2 exploits event constraints to optimize CEP over large volumes of business transaction streams. Since the optimization opportunities arise at runtime, the system provides a runtime query unsatisfiability (RunSAT) checking technique that detects optimal points for terminating query evaluation. To assure efficiency of RunSAT checking, the system precomputes the query failure conditions to be checked at runtime. This guarantees a constant-time RunSAT reasoning cost, making the system highly scalable. The optimal query termination strategies are realized by augmenting the query with Event-Condition-Action rules encoding the pre-computed failure conditions. This results in an event processing solution compatible with state-of-the-art CEP architectures. Extensive experimental results demonstrate that significant performance gains are achieved, while the optimization overhead is small.

Figure 3:
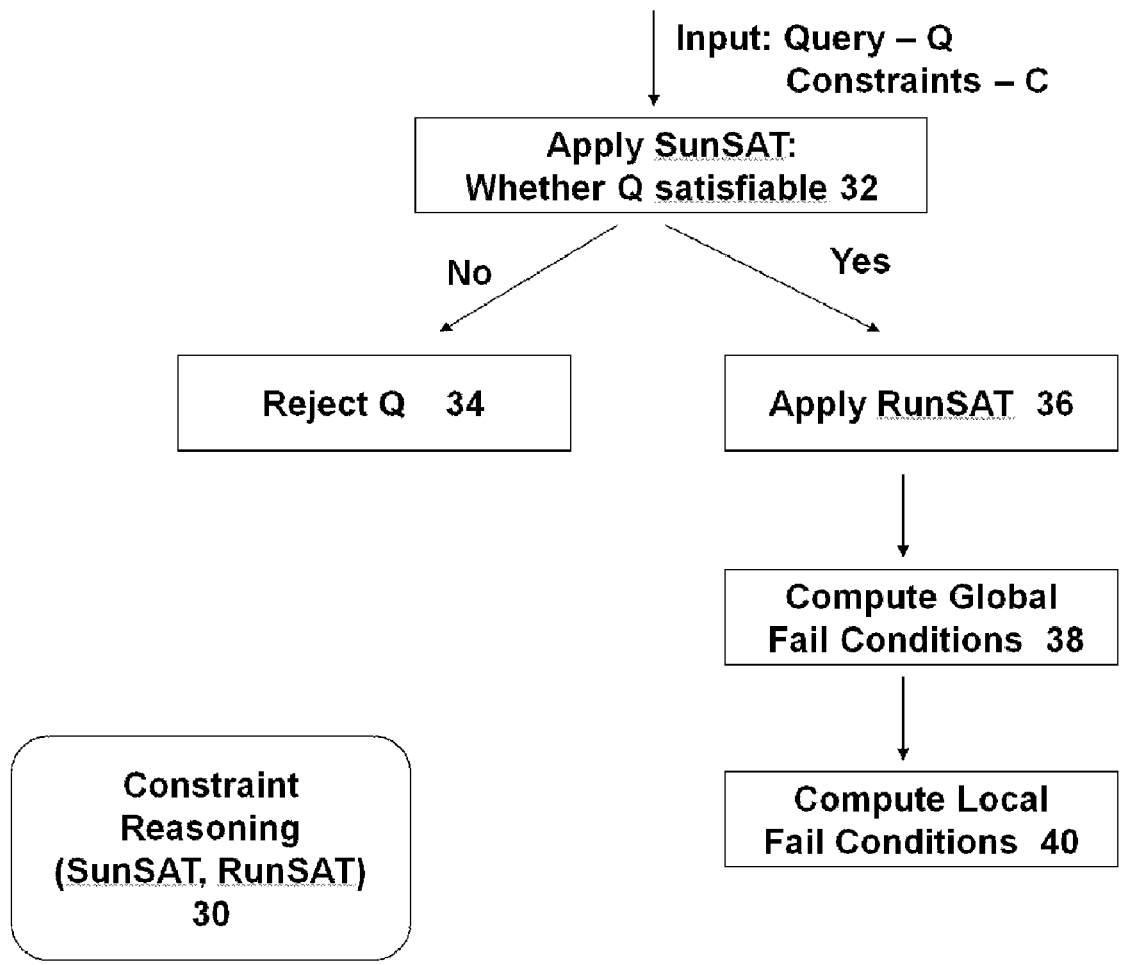
FIG. 3 shows in more details the constraint reasoning process in the engine of FIG. 2.

FIG. 3 shows in more details the constraint reasoning process in the engine 30. In this process, the system applies SunSAT to determine whether the query is satisfiable (32). If not, the query is rejected (34). Alternatively, if Q is satisfiable, the system applies RunSAT (36). The system then determines global failure conditions (38) as well as local failure conditions (40).

Figure 4:
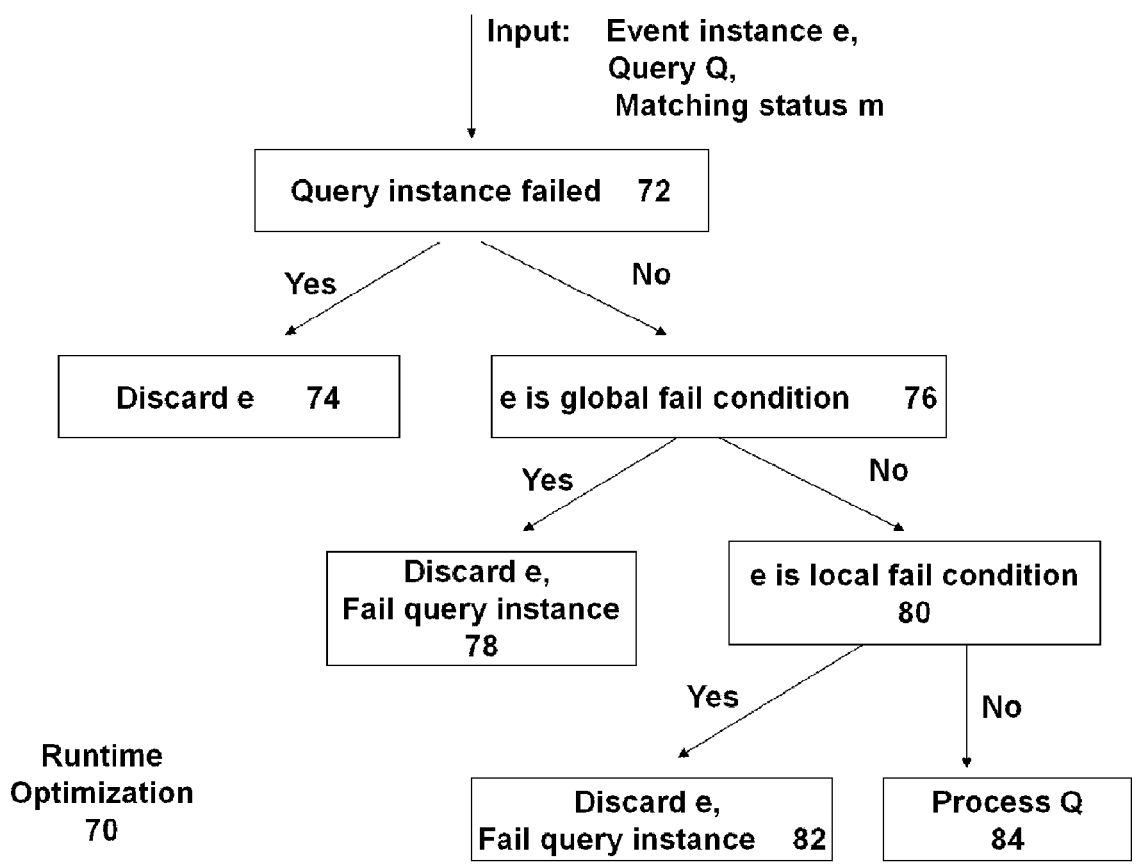
FIG. 4 shows more details of the run time optimization process in FIG. 2.

FIG. 4 shows more details of the run time optimization process in the optimizer 70. The process checks to see if the query instance has failed (72). If so, the system discards the event instance e (74). Alternatively, the system checks if the instance e can cause a global failure condition (80). If so, e is discarded and the query instance is rejected (82). Alternatively, if the event e does not cause local failure, the query is processed (84).

The engine 30 uses a polynomial time, sound and complete RunSAT checking algorithm for detecting the unsatisfiable query matches. This algorithm is based on a formal logic reasoning considering the event query, the partial event history and the event constraints such as workflows. In one embodiment to improve the RunSAT performance, a general pre-processing mechanism (based on abductive inference) pre-computes query failure conditions. Further, the system uses a set of simple yet common event constraints that allow constant time RunSAT. These techniques augment event queries with pre-computed failure conditions. This facilitates the integration of the techniques into state-of-the-art CEP architectures. As discussed below, an experimental study demonstrates that significant performance gains, i.e., memory savings up to a factor of 3.5 and CPU savings at a factor of 2, are achieved through this approach, with a very small almost negligible overhead for optimization itself.

Event Model. An event (or event instance), denoted as the lower-case letter $e_i$, is defined to be an instantaneous, atomic (happens completely or not at all) occurrence of interest. An event type, denoted as the corresponding upper-case letter $E_i$, defines the properties that all the event instances $e_i$ must have. The properties of an event instance $e_i$ include a set of attributes $e_i.A_1, \ldots, e_i.A_n$, and a timestamp $e_i.t$ of its occurrence.

The input to the CEP system is a stream of events ("event history") ordered by their timestamps. The event history can be partitioned into multiple sub-sequences based on certain criteria, such as transactions ids, session ids, RFIDs, etc. Each partition of the event history a trace h.

Event Constraints. Software and workflow models exhibit certain order and occurrence constraints), and CEP queries need to capture these occurrence and order between events (defined later). These constraints can be expressed using a subset of a general event language $\Lambda$.

An event language $\Lambda$ contains a set of event types $E_i$, denoted as $\epsilon$, a variable h denoting the event history, a binary function<, logic connectives ($\wedge, \wedge, \neg, \rightarrow$), quantifiers ($\exists$ and $\forall$). A formula of $\Lambda$ is either:

$E_i[h]$, iff an event instance $e_i \epsilon h$ of type $E_i$;

$E_i[h] < E_j[h]$, iff event instances $e_i, e_j \epsilon h$ of type $E_i$ and $E_j$, respectively, with $e_i.t < e_j.t$;

Any formula built upon the above two atomic formulas by means of the logical connectives and $\exists h$ and $\forall h$.

$\mathcal{L}$ and its derivatives have been used in the literature to describe the semantics of various applications. Since $\mathcal{L}$ is very general, in many practical scenarios, only subsets of $\Lambda$ are considered. Two types of constraints allow polynomial time reasoning under both static and runtime case. These constraints may be explicitly given by the business rules or they can be extracted from a given workflow model. $\mathcal{C}$ is denoted as a conjunction of a set of event constraints, which contains order constraints $\mathcal{C}^t$ and occurrence constraints $\mathcal{C}^o$.

$\forall h_e, \neg(E_j[h_e] < E_i[h_e])$, called order constraints, denoted as $f^t$;

Horn clauses built upon $E_i[h_e]$ and $\forall h_e$, called occurrence constraints, denoted as $f^o$.

Here $h_e$ denotes the entire trace, indicating that the constraint must hold w.r.t. the scope of the entire trace. Such global semantics is common.

TABLE 1

Constraints that Allow Constant-time Runtime Reasoning 1. prior($E_i, E_j, h_e$) := $\forall h_e, \neg(E_j[h_e] < E_i[h_e])$
2. exclusive($E_i, E_j, h_e$) := $\forall h_e, E_i[h_e] \rightarrow \neg E_j[h_e]$
3. require($E_i, E_j, h_e$) := $\forall h_e, E_i[h_e] \rightarrow E_j[h_e]$ However, even polynomial time runtime reasoning is not always satisfactory, especially if it is more costly than executing the CEP query itself. The identification of three common constraints (Table 1), allow constant-time runtime reasoning. This assures negligible runtime reasoning overhead and thus significantly improves the CEP performance.

The system focuses on how the core common to most CEP languages can be optimized by exploiting commonly available constraints. An event query is specified as follows:

EVENT <event expression> WHERE <equal-id> [<predicates>]

The EVENT clause specifies the event expression. Due to limited space, only conjunctive queries are discussed, which contain the following three operators.

$SEQ(E_1,E_2,\ldots,E_n)(t_s,t_e):=\exists t_1^s \leq t_1^e < t_2^s \leq t_2^e < \ldots$
$< t_n^s \leq t_n^e$, such that $E_1(t_1^s,t_1^e) \wedge E_2(t_2^s,t_2^e) \wedge \ldots$
$\wedge E_n(t_n^s,t_n^e)$. Then $t_s=t_1^s$ and $t_e=t_n^e$;

$AND(E_1,E_2,\ldots,E_n)(t_s,t_e):=\exists t_1^s,t_1^e,t_2^s,t_2^e,\ldots,$
$t_n^s,t_n^e,E_1(t_1^s,t_1^e) \wedge E_2(t_2^s,t_2^e) \wedge \ldots \wedge E_n(t_n^s,t_n^e)$.
Then $t_s=\min(t_1^s,t_2^s,\ldots t_n^s)$ and $t_e=\max(t_1^e, t_2^e,\ldots t_n^e)$;

$OR(E_1,E_2,\ldots,E_n)(t_s,t_e):=\exists t_s,t_e,E_1(t_s,t_e) \wedge E_2(t_s, t_e) \wedge \ldots \overline{\wedge E_n(t_s,t_e)}$.

The output of these operators is called a composite event. While the event instance (called primitive event) has a point-in-time semantics, $e_i.t$, the composite event has an interval semantics, where $t_s$ and $t_e$ are the timestamp of the first and the last event in the event expression, respectively. The above definitions adopt this interval semantics and support the arbitrary nesting of these operators. As a special case, when $E_i$ is a primitive event type, $t_S$ equals $t_e$.

The WHERE clause contains an equality condition on some common attributes across multiple event types in the query, which is typical for monitoring applications. This equality condition partitions the event history into subsequences. Each subsequence correspond to one trace $h_e$ defined previously. The query is then evaluated against each $h_e$. There might be additional predicates over the other attributes as well. The output of the query contains the concatenation of all matching event instances.

Figure 5:
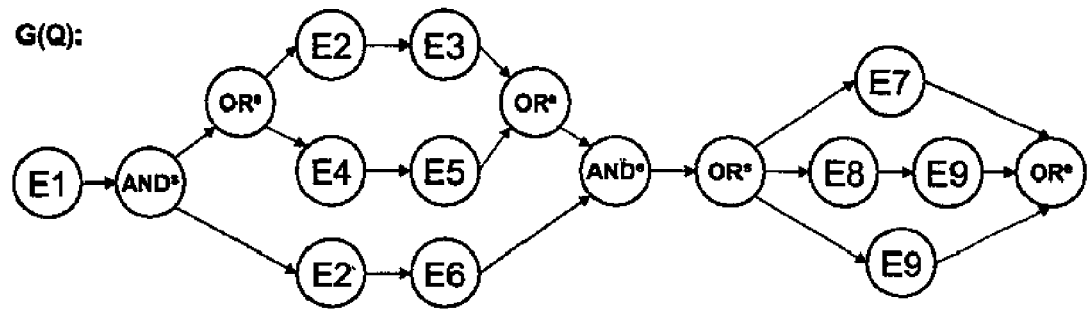
FIG. 5 depicts example AND-OR nodes.

For ease of presentation, an acyclic directed graph $G(Q) = <N, V>$ is used to represent an event query Q. Each node is either an event type or one of the four special types of nodes, namely, the start ($AND^S$), end ($AND^E$) of the AND operator and the start ($OR^S$), end ($OR^E$) of the OR operator. Each edge represents the ordering relationship between event types in the query. Since query Q is well nested, the corresponding start and end of AND (OR) nodes are paired as well. FIG. 5 depicts such an example.

The event query is translated into the formula in $\wedge$ that preserves unsatisfiability. For any conjunctive event query Q, the corresponding formula in $\wedge$ is:

$\exists h_e \wedge \{E_i[h_e] \wedge E_j[h_e] < E_k[h_e]$, for any $E_i \in Q$ and for any $E_j$, $E_k$ which have a order relationship in Q (i.e., closure). Through this translation, $C$ and Q can be checked for unsatisfiability.

Next, Query Unsatisfiability Checking is discussed. As motivated in Example 1, given an event query Q, event constraints C and a partial trace $h_p$ observed at runtime, the system determines whether a query match may exist in the complete trace $h_e$ with $h_p \subset h_e$. This is known as the runtime query unsatisfiability (RunSAT) problem. There is an extreme case of this problem, i.e., given an event query Q and event constraints C, does a query match exist in any trace $h_e$. This extreme case is the static query unsatisfiability (SunSAT) problem. 2

In Static Query Unsatisfiability (SunSAT), given a query Q and event constraints C, Q is said to be statically unsatisfiable iff there does not exist a trace $h_e$ which is consistent with C and matches Q.

Static satisfiability checking determines whether $C \wedge Q|=\perp$. This involves two parts, namely, the occurrence consistency checking and the temporal consistency checking, based on the constraint-based translation of Q.

Occurrence consistency makes sure that all the event instances required in the query can indeed occur together. This is achieved by checking whether the following boolean expression is satisfiable: $\wedge\{E_i[h_e]\} \wedge C^o$, for any $E_i \in Q$. When the query is conjunctive and $C^o$ contains only Horn clauses, the checking can be done in polynomial time.

Temporal consistency means that each event instance required in the query could occur in the desired order. This is to check $\wedge\{E_j[h_e] < E_k[h_e]\} \wedge C^t$, for any $E_j$, $E_k$ that have order relationship in Q. The expression is not satisfiable iff at least one $\neg(E_j[h_e] < E_k[h_e])$ can be inferred from $C^t$. This involves the computation of the closure on Q and $C^t$, which can also be done in polynomial time.

Next, Runtime Query Unsatisfiability will be discussed. RunSAT checking differs from SunSAT checking in that RunSAT checking considers a partial trace observed so far. In this sense, SunSAT checking can be considered as a special case of RunSAT checking, i.e., with empty partial trace. Since event data becomes available to the CEP engine in the order of occurrences, the partial trace $h_p$ is always a prefix of the entire trace $h_e$. 3

In Runtime Query Unsatisfiability (RunSAT), given a query Q, event constraints C and a partial trace $h_p$, Q is said to be runtime unsatisfiable iff there does not exist a trace $h_e$ that is consistent with C and contains a match to Q, where $h_p$ is prefix of $h_e$.

Figure 6:
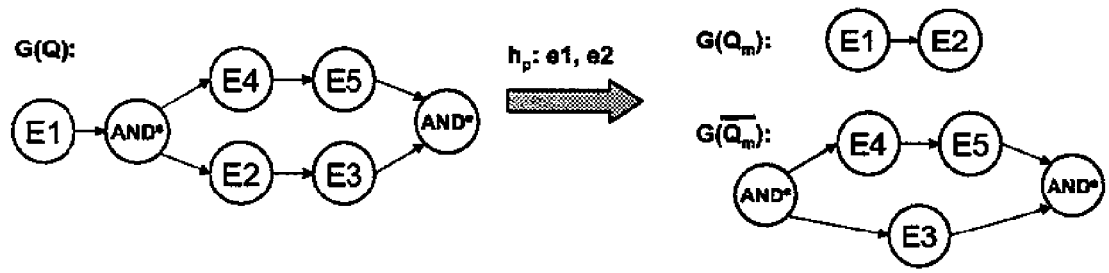
FIG. 6 depicts a query Q, partial trace $h_p$, matching and remaining sub-query $Q_m$, $\overline{Q_m}$.

In Matching and Remaining Sub-Query, given a partial trace $h_p$, the matching sub-query $Q_m$ can be defined as follows. A query node $E_i$ is contained in $Q_m$ iff the sub-graph that contains $E_i$ and all the nodes that can reach $E_i$ in $G(Q)$ has a match over $h_p$. The remaining query $\overline{Q_m}$ contains all the unmatched query nodes $E_i$. The AND nodes are included in $\overline{Q_m}$ if not all of its branches are matched. FIG. 6 depicts a query Q, partial trace $h_p$, matching and remaining sub-query $Q_m$, $\overline{Q_m}$.

Lemma 4 Given a partial trace $h_p$ and event constraints C, if there does not exist a remaining trace $\overline{h_p}=h_e-h_p$ that contains a match to $\overline{Q_m}$ then Q is runtime unsatisfiable.

The system checks the unsatisfiability of $\overline{Q_m}$, which will lead to the unsatisfiability of Q This naturally leads to the next issue to find the constraints that must hold true for the remaining trace $\overline{h_p}$, referred to as dynamic constraints. To distinguish, the initially given event constraints are called static constraints. The dynamic constraints are derived from the static constraints and hold true for the future data.

In Dynamic Constraints, the constraints that the remaining trace $\overline{h_p}$ must satisfy evolve as the partial trace $h_p$ grows. Intuitively, the event instances in $h_p$ serve as facts. New constraints can be inferred based on these additional facts and the static constraints. The facts provided by $h_p$, denoted as $F_{h_p}$, include:

$\wedge\{E_i[h_p]\}$, for any $e_i \in h_p$ of type $E_i$ $\wedge\{\neg E_j[h_p]\}$, for any $E-\{E_i\}$ above The dynamic constraints $C_d(\overline{h_p})$ can be evaluated as follows.

$$C_d(\overline{h_p})=C \wedge F_{h_p}=C \wedge \{E_i[h_p]\} \wedge \{\neg E_j[h_p]\} \qquad (1)$$

The evaluation of Exp. (1) differs from the traditional propositional logic resolution, which basically removes two opposite literals from two clauses in that first C also contains order constraints $C^t$, and second each constraint has its own scope.

FIG. 7 depicts the resolution rules for constraints with scopes. The constraints above the line entail the constraint below the line. Each occurrence constraint $f^o$ is in the form of a disjunction of atomic literals and negation only applies to the atomic literals. First, from rule T1, while the order constraints are independent of the occurrence constraints in the static case, they become related in the dynamic case. That is, an occurrence constraint can be derived at runtime through an order constraint. Second, the logical resolution needs special care when each constraint has a valid scope (O1-O3). O1 states that when the two literals have the same scopes, the classic resolution rule can be applied. O2 can be generalized to any $h_p$ that is a subsequence of $h_e$. O3 shows that the resolution of the constraints with different scopes may need additional evidence from the partial trace $h_p$. Example 2 illustrates a sample scenario for applying these rules.

Example 2 5 Assume two event constraints, $f_1{}^t=(\neg(E_1[h_e] <E_2[h_e])$ and $f_2{}^o=E_3[h_e]\to E_1[h_e]$. When $e_2 \epsilon h_p$, i.e, $E_2[h_p]$, $\neg E\_1[h\_p]$ can be inferred from $f^t{}_1$ by rule T1. However, whether $\neg E_3[h_e]$ can be inferred from $f_2{}^o$ depends on whether $E_1[h_p]$ is false or not (by rule O3). Given a query Q, static event constraints C and a partial trace $h_p$, Q is runtime unsatisfiable iff the remaining query $\overline{Q_m}$ is statically unsatisfiable w.r.t. the dynamic constraints $C_d(\overline{h_p})$.

RunSAT checking for a given prefix trace $h_p$ involves two tasks. First, the dynamic constraints $C_d(\overline{h_p})$ that hold true for the remaining trace $\overline{h_p}$ is derived as shown in Exp. (1). Then RunSAT reasoning checks whether the remaining query $\overline{Q_m}$ is unsatisfiable by $C_d(\overline{h_p}) \wedge \overline{Q_m}$. If Q is statically satisfiable, then only occurrence consistency needs to be checked. There is no need to re-check the temporal consistency for remaining query.

$$C_d(\overline{h_p}) \wedge \overline{Q_m} = C_d(\overline{h_p}) \wedge E_j[\overline{h_p}]\}, E_j \epsilon \overline{Q_m} \quad (2)$$

The evaluation of Exp. (1) and (2) both utilizes the resolution rules in FIG. 7. Since these rules add a constant scope checking cost to the classic resolution rules, it can be done in polynomial time for Horn clauses.

Effective Dynamic Constraints. Assume that the original conjunctive query Q is statically satisfiable. Based on Exp. (2), the only dynamic constraints that can fail $\overline{Q_m}$ must be in the form of a disjunction of negated atomic literals, such as $\neg E_i[h_e] \vee \neg E_j[h_e]$ or $\neg E_k[\overline{h_p}]$. These constraints are known as effective dynamic constraints, $C_d{}^r(\overline{h_p})$, where $C_d(\overline{h_p}) \models C_d{}^r(\overline{h_p})$. This leads to goal driven derivation of these specific dynamic constraints.

RunSAT is considered for disjunctive queries. Note that SunSAT for an arbitrary disjunctive query is NPComplete. While a potentially exponential transformation into its disjunctive normal form may be acceptable in the static case when the size of the query is typically small, such exhaustive approach may not be appropriate to be used at runtime for the dynamic case. Rather an efficient, even if incomplete, algorithm for handling disjunctive queries is needed.

The basic idea is to break the original query into several non-overlapping conjunctive partitions. Starting from the OR operator that does not contain any other nested OR operator, each branch of this OR operator is marked as a conjunctive partition. This OR operator is then replaced by a single virtual node that represents a disjunction of several partitions. Similarly, this mechanism is applied to the rest of the OR operators in the query until all the OR operators are replaced.

FIG. 8 depicts an example for a disjunctive event query. As can be seen, each OR branch is a conjunctive partition. These partitions form a partition hierarchy as also shown in FIG. 7. The RunSAT technique described above is applicable to each of these six partitions. C6 is a conjunctive partition with two special nodes (C1 V C2 and C3 V C4 V C5). Intuitively, if all the partitions within the same special node are unsatisfiable, the current partition is also not satisfiable. The number of conjunctive partitions generated by this method is linear in the query size. This technique however is incomplete. For example, after the partitions C1, C3, and C4 fail, the query may have failed already since C2 $^\wedge$ C5 may be statically unsatisfiable already.

Next, an efficient approach for RunSAT will be discussed. To achieve earliest possible detection of the runtime query unsatisfiability, RunSAT checking should be conducted each time when $h_p$ grows, i.e., whenever a new event instance is received. In other words, the dynamic constraints derivation, Exp. (1), and RunSAT reasoning, Exp. (2), have to be performed for each event instance As $h_p$ grows from $h_{p_1}$ to $h_{p_2}$, even an incremental method for deriving $C_d(\overline{h_{p_2}})$ from $C_d(\overline{h_{p_1}})$ may not be satisfactory. The reason is that first the system may have to store some constraints in $C_d(\overline{h_{p_1}})$ in order for incremental reasoning, and second many dynamic constraints may be derived that are not useful to fail the query at all.

Fortunately, given the fact that only the effective dynamic constraints could fail the query, an abduction-based method can be used to pre-compute the conditions when those effective dynamic constraints will become true. If any of the conditions are met at runtime, which presumably are cheap to monitor, effective dynamic constraints begin to hold. Abductive inference can be formally defined as follows. For a given effective dynamic constraint $f_d$, p is called an explanation of $f_d$ if C and p are consistent with each other and together entail $f_d$.

1) $C \wedge p \models f_d$;
2) $C \wedge p$ is satisfiable.

Here p has to be a conjunction of $E_i[h_p]$ and/or $\neg E_i[h_p]$ since these are the only facts drawn from the prefix trace $h_p$. The system finds all such explanations $\forall\{p\}$.

To infer the non-occurrence of $E_i$ in the remaining trace, the following three expressions compute its possible explanations.

$$C^t \wedge p_1 \models \neg E_i[\overline{h_p}] \quad (3)$$

$$C^o \wedge p_2 \models \neg E_i[h_e] \quad (4)$$

$$C^o \wedge C^t \wedge p_3 \models \neg E_i[h_e] \quad (5)$$

First, by using order constraints $C^t$ alone, no $E_i$ instance can occur in the remaining trace from Rule T1 in FIG. 7.

Next, from rules O1-O3 in FIG. 7, two alternative ways that $\neg E_i[h_e]$ can be inferred, namely, from occurrence constraints $C^o$ only or from both occurrence $C^o$ and order constraints $C^t$. Solving Exp. (4) is the classic propositional abductive inference problem.

Lastly, solving Exp. (5) needs aid from Rule O3 in FIG. 7. For any order constraint $\neg(E_r[h_e]<E_s[h_e])$, given the fact that $\neg(E_r[h_e]<E_s[h_e]) \wedge E_s[h_p] \wedge \neg E\_r[h\_p] \wedge \neg E_r[h_e]$, Exp. (5) can be rewritten into (6) below, which replaces the order constraint by the occurrence constraints it can possibly imply. Then $p_3 = E_s[h_p] \wedge \neg E_r[h_p] \wedge p'$.

$$C^o \wedge E_s[h_p] \wedge \neg E_r[h_e] \wedge p' \neg E_i[h_e] \quad (6)$$

Although abductive inference for Exp. (5) and (6) is NP-Complete in general, since it is a one-time cost compared to the long-running event query, the abduction cost may be still acceptable. However, note that the explanations can contain multiple positive events, such as $E_1[h_p] \wedge E_2[h_p] \wedge E_3[h_p]$ or $E_4[h_p] \wedge E_5[h_p]$. In fact, monitoring all such complex explanations could be more expensive than just executing the event query itself and thus becomes infeasible. Hence, a cost-based approach, i.e., monitoring only those explanations that will provide the best cost benefit, is necessary.

Next, incremental RunSAT Reasoning will be discussed. The second performance issue with RunSAT is that the system still has to perform the RunSAT reasoning Exp. (2) for $C_d^r(\overline{h_{p_1}})$ and $C_d^r(\overline{h_{p_2}})$, respectively. In other words, the system still stores the constraints $C_d^r(\overline{h_{p_1}})$ in order to check whether they would fail the new remaining query. For monotonic queries, this is not necessary.

Definition 6 Monotonic Query. Assume two prefix traces $h_{p1}$ and $h_{p2}$ where $h_{p1}$ is a prefix of $h_{p2}$. The matching subqueries for a given query Q under these two prefix traces are $Q_{m1}$ and $Q_{m2}$, respectively. Query Q is monotonic if and only if $Q_{m1}$ is a subquery of $Q_{m2}$.

Queries with SEQ, AND operators are monotonic.

Lemma 7 Incremental RunSAT Reasoning. Assume that the prefix trace grows from $h_{p1}$ to $h_{p2}$. For a conjunctive query Q, the remaining queries are $\overline{Q_{m_1}}$ and $\overline{Q_{m_2}}$, and the effective dynamic constraints are $C_d^r(\overline{h_{p1}})$ and $C_d^r(\overline{h_{p2}})$, respectively. If Q is a monotonic query, then $C_d^r(\overline{h_{p_1}}) \wedge \overline{Q_{m_1}}$ is satisfiable $\rightarrow C_d^r(\overline{h_{p_2}}) \wedge \overline{Q_{m_2}}$ is satisfiable.

To summarize, to improve the RunSAT performance, first, the derivation of Effective dynamic constraints can be pre-computed through abduction. Second, when the query is monotonic, there is no need to reconsider the previously derived dynamic constraints. These two techniques pave the way for integrating RunSAT into the event query engine.

Integrating RunSAT into CEP Engine

The C-CEP engine employs the commonly-used automata model (i.e., NFA) since it has been shown to be a natural fit for event pattern matching. When registering an event query into the C-CEP engine, the engine first checks whether this query is statically satisfiable w.r.t. event constraints C. Then it uses the abductive inference to precompute the failure conditions. The original event query is augmented with these failure conditions as Event-Condition-Action rules. During query execution, these failure conditions are efficiently monitored. If any of these failure conditions are met, the current trace is unsatisfiable to the query and any partial matches are removed.

Next, the NFA Query Execution Model is discussed. For query execution, the commonly-used NFA model is extended to support the AND operator. Using this common execution model assures that The work can be easily integrated into existing CEP systems as a semantic query optimization module.

The NFA model includes two types of states, namely, regular states and logical states, and it can be easily generated from the query graph in FIG. 5. Each node $E_i$ in the query corresponds to a regular state in the NFA. At runtime, the event instances that match these states are kept in the memory in order to generate the final output. The $AND^E$ corresponds to logical state, which is activated only when all the input transitions have been triggered. There is a self-loop of * transition over those nodes which have non-ϵ output transitions in order to capture the temporal following semantics. For example, the query in FIG. 5 is translated into the automaton in FIG. 9.

Next, the Augment Query with Fail Conditions is discussed. The query engine exploits the constraints in Table 1 for optimizing the event query. Supporting these constraints does not require a cost-based optimization since the extra overhead is small. While developing a cost-based optimization framework for the more complex constraints remains The future work, The performance evaluation for these simple constraints also indicates when such optimization is beneficial, which provides the basis for cost estimation.

The effective dynamic constraints that could fail the query are $\neg E_i[h_e]$ and $\neg E_i[\overline{h_p}]$. $\neg E_i[h_e]$ is called global since it holds for the entire trace and is independent of the query matching status. $\neg E_i[\overline{h_p}]$ is called local since it only holds for the remaining trace. Hence whether $\neg E_i[\overline{h_p}]$ can be used to fail the query depends on whether the remaining query contains $E_i$ or not.

In Managing Global Failing Conditions, the query is augmented with global failing conditions. For each $E_i$ in the query, all failing conditions are derived for $\neg E_i[h_e]$. By solving Exp. (4), the failing conditions $p_2 = E_j[h_p]$ if $C^o$ ($E_j[h_e] \rightarrow \neg E_i[h_e]$). By solving Exp. (5), which is rewritten into Exp. (6), the failing conditions $p_3 = E_j[h_p] \wedge \neg E_k[h_p]$ if $C^o(E_k[h_e] \rightarrow E_i[h_e])$ and $C^t \neg (E_k[h_e] < E_j[h_e])$.

Figure 10:
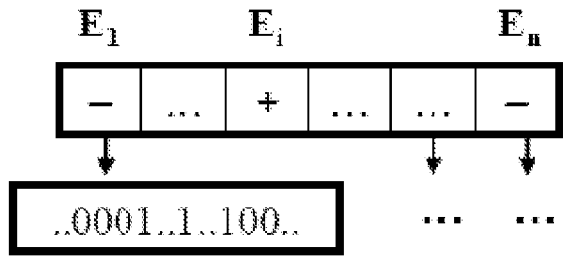
FIG. 10 shows a data structure to store failing conditions.

These failing conditions can be organized into a simple data structure depicted in FIG. 10. An array with the size equal to the number of distinct event types is used. The '+' symbol at $E_i$ means that $E_i[h_p]$ is a failing condition of the query. Each entry $E_j$ marked as '−' is associated with a bit array. For any $E_k$ with the bit being 1 in that bit array, $E_j[h_p] \wedge \neg E_k[h_p]$ is a failing condition of the query.

At runtime, given an event instance of $E_i$, if the corresponding entry in the global failing condition is marked as '+', the processing of this trace is terminated. Any partial results or active states for this trace can be removed. If the entry is marked as '−' and there is a bit array associated with it, a bit-AND is done with a runtime bit array whose entries indicate the occurrence of $E_i$ in $h_p$ (1 denotes non-occurrence). If the output of this bit operation is not zero, the matching for this trace fails.

Next, Managing Local Failing Conditions is discussed. Since the local failing conditions are tightly coupled with the particulars of the current query matching status, the NFA is built by introducing a special state labeled "F" (for "Failed"). All transitions triggered by local failing conditions are directed to this "Failed" state.

Figure 11:
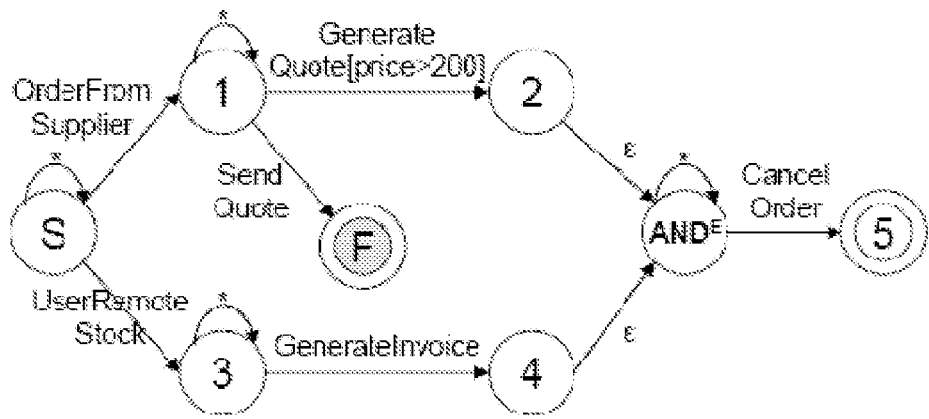
FIG. 11 depicts the augmented query for an event pattern.

For each $E_i$ in the query graph, by Exp. (3), the local failing conditions $P_1$ for any $E_j$ that is reachable from $E_i$ in the query graph are determined. The failing conditions in NFA are implemented as the additional transitions of $E_i$. These failing conditions are valid only when none of these transitions out of $E_i$ have been matched yet. Hence there is a special runtime issue, i.e., once the NFA transition from $E_i$ to the next state is made, the local failing conditions at $E_i$ need to be deactivated. Intuitively, the query matching status is changed, which breaks the assumption that none of $E_i$'s descendant states have been matched. Such NFA state deactivation can be efficiently supported using a flag. Obviously, both global and local failing condition checking can be done in constant time. FIG. 11 depicts the augmented query for event pattern EP1. The SendQuote event is the local failing condition.

Figure 12:
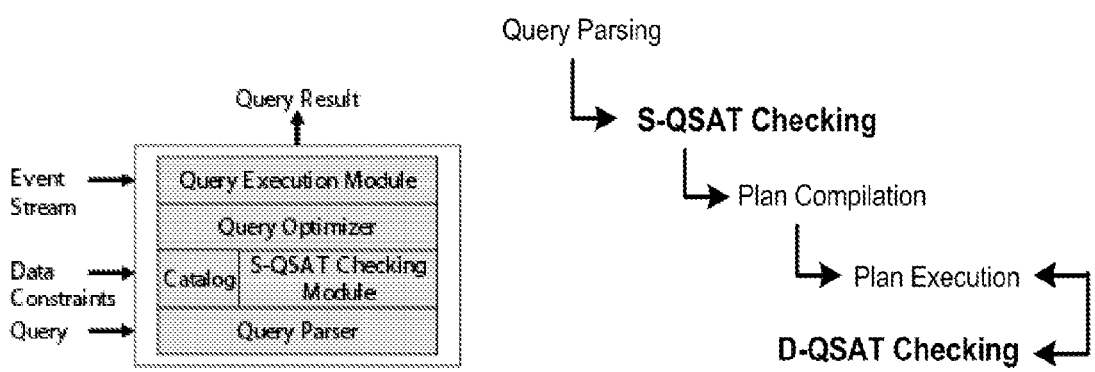
FIG. 12 shows an exemplary query processing system.

FIG. 12 shows an exemplary query processing system. In this system, a query is presented to a query parser and data constraints are provided to a catalog. The query is sent to an S-QSAT checking module and then sent with the constraints to a query optimizer that optimizes the query execution instructions to be run by a query execution module. The event stream is provided to the query execution module which in turn generates the query result.

Figure 1:
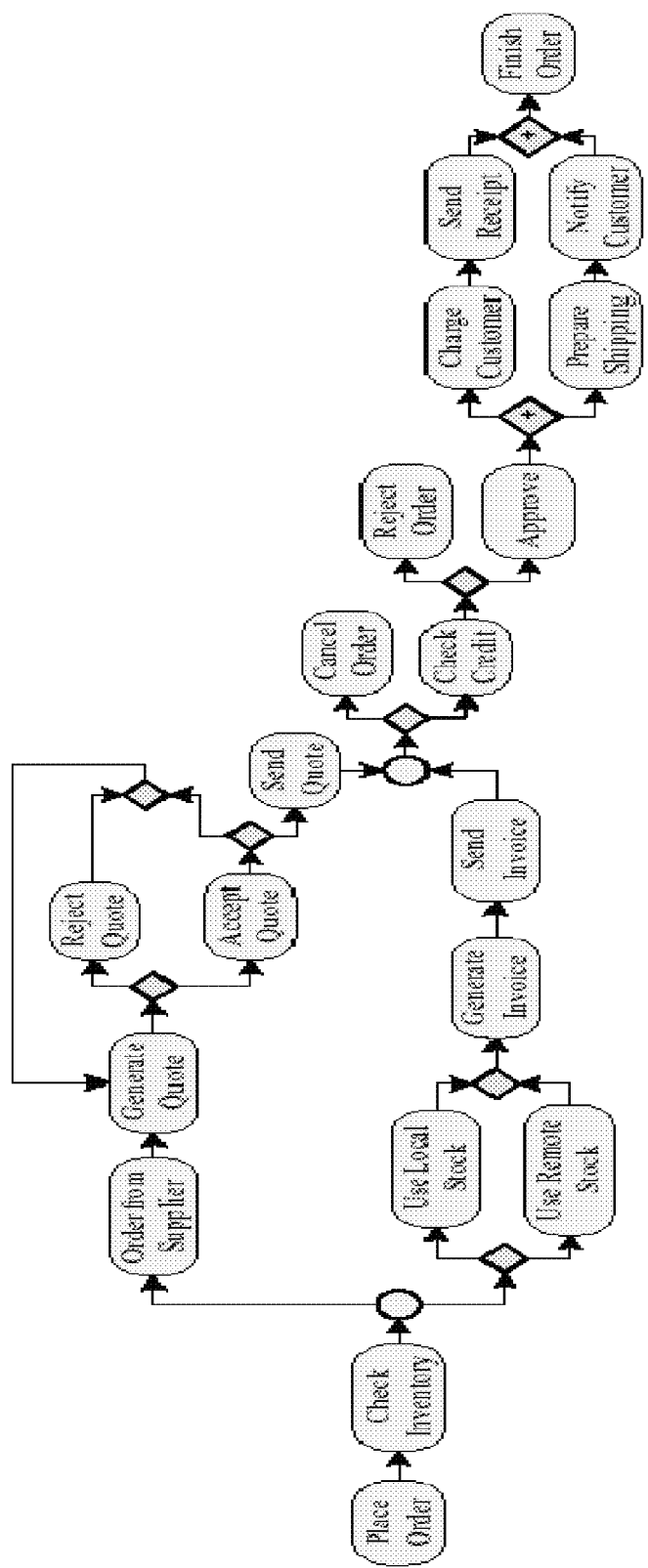
FIG. 1 shows an exemplary workflow illustrating exemplary online order transactions.

Next, experimental Evaluations are discussed. A Java-based CEP system was developed with an event generator that creates event streams based on the workflow in FIG. 1 with the following parameters: 1) event attributes: 5 attributes (besides timestamp) per event, including three integer-type and two string-type; 2) number of allowed values of each event attribute, used to control the selectivity of the query predicates. The values conform to uniform distribution; 3) probability distribution of exclusive choice construct, used to control the query selectivity; and 4) number of concurrent traces (1000). The events of concurrent traces are interleaved in the event stream. Lastly, the number of loops on Generate-Quote in the workflow is fixed at 3. The test machine has an Intel(R) Pentium 1.8G processor and a 1 GB RAM, running Windows XP and Java 1.5 SDK.

The performance of C-CEP is compared with regular CEP, denoted as R-CEP. For R-CEP, each time a trace is finished, i.e., whenever a CancelOrder, RejectOrder or FinishOrder event is received, any partial matches and automata states associated with this trace can be removed. For C-CEP, the system augments the query with RunSAT failing conditions. Whenever a RunSAT failing condition is satisfied, C-CEP can remove the data. Both C-CEP and R-CEP were run in CPU-limit mode, i.e., events arrive to the CEP system at a rate such that the query processing never needs to wait for data. The system measured 1) total number of NFA probes (for event matching), 2) total execution time for processing the given event stream, and 3) peak number of events maintained in all NFA states, which reflects the peak memory usage. This number is collected after system warm-up, i.e., after 1000 traces are processed. For C-CEP, the execution time includes the RunSAT checking cost. The input event stream contains 400K events from 20,000 traces for all the experiments below.

Next, Results on Sequence Queries are discussed. The system compared the performances of C-CEP and R-CEP on sequence queries. The experimental results for Query Q1 are shown below, which monitors those expensive orders that uses remote stocks (rare case). The global failing condition for this query is the UseLocalStock event, and the local failing condition for the GenerateInvoice event is the SendInvoice event.

EVENT SEQ(CheckInventory,UseRemoteStock,GenerateInvoice)
WHERE GenerateInvoice.price>200

Figure 13:
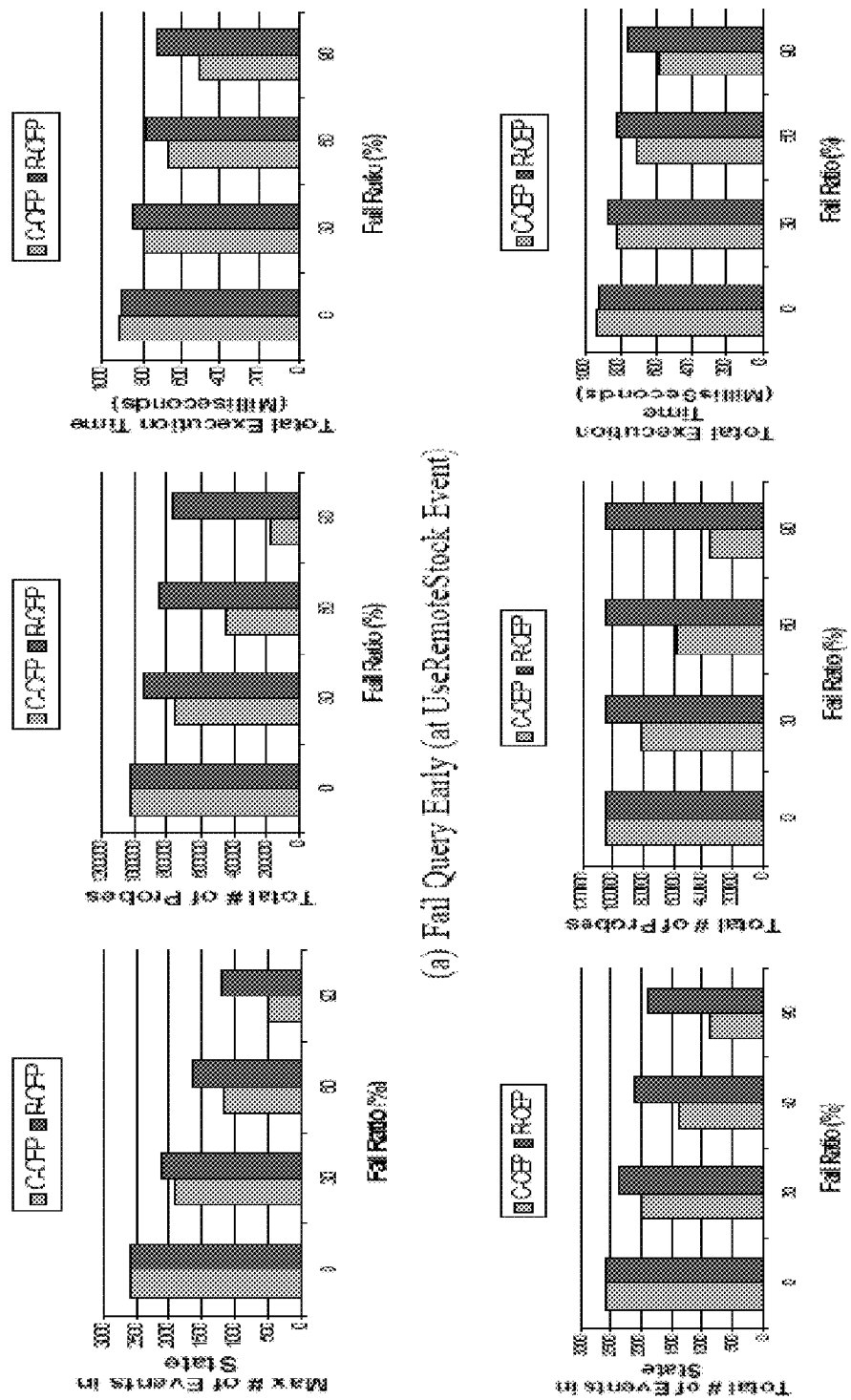
FIGS. 13-15 show various exemplary test results.

In the first experiment, the matching probability of the UseRemoteStock event in the query was varied from 0% to 90%. This is done by varying the probability distribution of the exclusive choices on UseLocalStock and UseRemoteStock. The fail ratio of an event E in the query is defined to be $(1-\sigma_E)$ with $\sigma_E$ being the matching probability of E. The results are shown in FIG. 13($a$).

Two observations are made from the results. First, as the fail ratio increases, both the total number of probes (and hence total execution time) and peak memory usage decrease. For 90% fail ratio, significant savings in memory (60%) and in execution time (32%) compared to R-CEP are achieved. This promising result suggests that C-CEP is especially attractive for those targeted alert queries. Note that the savings in execution time by C-CEP are not precisely proportional to the savings in NFA probes. The reason is that after a trace is determined to be unsatisfiable, for every event in the rest of the trace, a single check is needed to determine whether this event belongs to a failed trace. Second, for zero fail ratio (i.e., all traces have matches to the query), which can be seen as the worst case for C-CEP since no evaluations can be terminated early while extra cost has to be paid for RunSAT checking, the execution time of C-CEP is only negligibly higher than R-CEP. This is also promising, indicating that even in the worst case, C-CEP has comparable performance with R-CEP.

Figure 14:
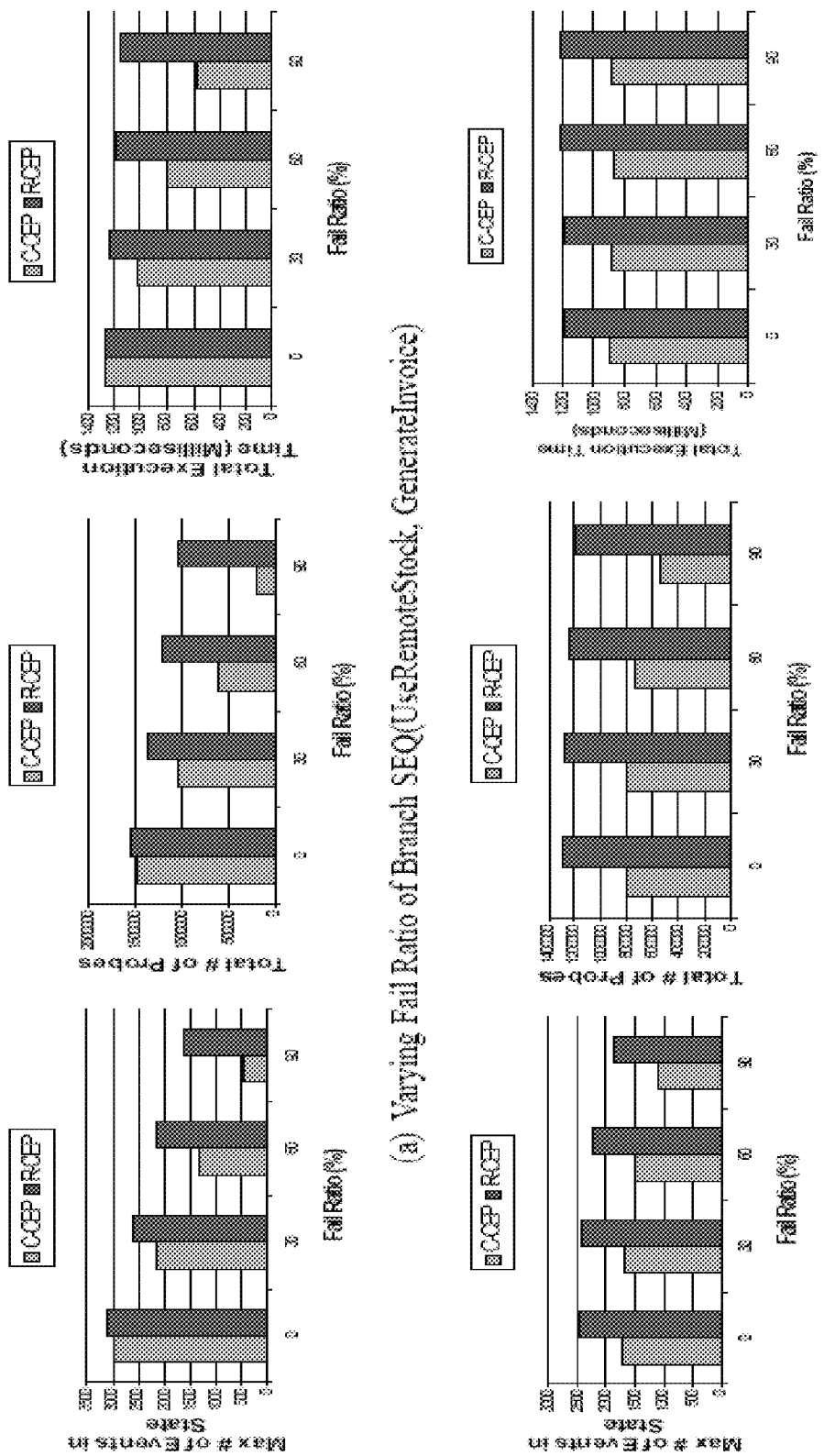

Next, how the query fail point affects the C-CEP performance is tested. In the previous experiment, the query fails always due to no match for the UseRemoteStock event. The case in which the query fails always due to no match for the GenerateInvoice event with price>200 is tested as the "fail late" case while the previous case the "fail early" case because the UseRemoteStock event is before the GenerateInvoice event in the event query. The matching probability of the GenerateInvoice event is varied from 0% to 90%, while fixing the matching probability of UseRemoteStoack to 100%. This is achieved by controlling the value range of the price attribute of the GenerateInvoice event. The results are shown in FIG. 14.

Figure 15:
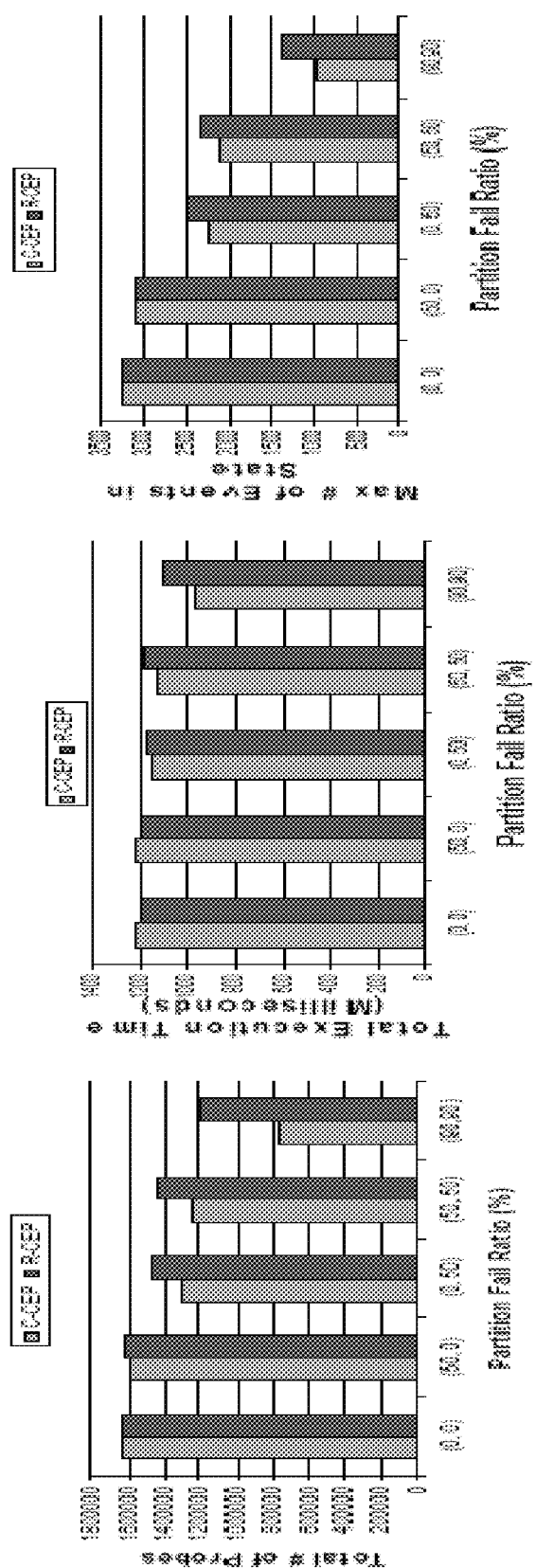

In the "fail late" case, for 90% fail ratio, the memory saving is 54% and execution time saving is 21%. Since failing late incurs more execution overhead, the gains are less than those achieved in the "fail early" case (FIG. 15). However, it still provides significant memory savings for alert queries and is thus useful when the memory is a stringent resThece.

Next, Results on AND Queries are discussed. The performances of C-CEP and R-CEP on AND queries are compared. The query is given below. The global failing conditions for this query are the UseLocalStock and the CancelOrder event, and the local failing condition for the GenerateQuote event is the SendQuote event.

EVENT SEQ(AND(SEQ(OrderFromSupplier, GenerateQuote),
SEQ(UseRemoteStock, GenerateInvoice)),FinishOrder)
WHERE GenerateQuote.price>200

Two sets of experiments were done. First, the matching probability of the first AND branch (i.e., SEQ(OrderFromSupplier, GenerateQuote)) (more specifically, the GenerateQuote event) to be 50% was fixed and the matching probability of the UseRemoteStock event was varied from 0% to 90%. The results are shown in FIG. 13($a$). Second, the matching probability of the second AND branch (i.e., SEQ(UseRemoteStock, GenerateInvoice)) was fixed at 50%, while varying the matching probability of the GenerateQuote event was fixed from 0% to 90%. Since 3 loops are involved for GenerateQuote event in the workflow, the failure on matching the first AND branch will be detected rather late compared to that for the second AND branch. This may result in performance difference between these two sets of experiments. The results are in FIG. 14($b$).

Two observations are made from this experiment. First, much more performance gains can be achieved compared to the sequence query Q1. As can be seen in FIG. 10($a$), for 90% fail ratio, the gains in peak memory usage and in execution time are 72% and 51% respectively. This is because Query Q2 is more complex than Query Q1, thereby rendering bigger partial matches. This causes higher event matching costs and memory overhead in R-CEP. The C-CEP on the other hand, can terminate the query execution as soon as one branch is found to be unsatisfiable. Another important observation is that the performance gains by C-CEP are determined by the AND branch that provides the most performance gains. The second AND branch, by failing early, enables much noticeable performance gains as fail ratio increases (FIG. 14($a$)). In contrast, the first AND branch, by failing late, enables much less performance gains until the fail ratio is very high (FIG. 14($b$)).

Turning now to results on OR Queries, the C-CEP performance for OR queries is tested. The Query Q2 above is modified by replacing the AND operator by the OR operator and use the new query in this experiment. This query contains three conjunctive partitions: 1) SEQ(OrderFromSupplier, GenerateQuote), 2) SEQ(Use-RemoteStock, GenerateInvoice), and 3) the entire query. The fail ratios of partitions 1 and 2 are modified and (fr1, fr2) denotes that partitions 1 and 2 have fr1 and fr2 fail ratios respectively. Each time a query failure condition is satisfied, corresponding query partitions will be pruned. The experimental results are shown in FIG. 15. When only one partition could possibly fail, i.e., at least one partition has 0% fail ratio, very little performance gains can be achieved by C-CEP. This is because the cost of the OR query is determined by the branch that provides the least performance gains. This is opposite to the AND query, whose cost is determined by the branch that provides the most performance gains (see Section 6.2). Hence, if a significant portion of the OR query will never fail, not much gains can be achieved by C-CEP, considering the extra RunSAT checking cost. Second, the performance gains increase with the partition fail ratios. When both partitions have high fail ratios, i.e., (90, 90), 30% gains in memory and 13% gains in execution time can be achieved by C-CEP. This is promising, indicating that even for OR queries, significant memory savings can still be achieved for anomaly detection queries.

In a scalability test for the above sequence, AND queries in which the event stream contains 4M events from 200,000 traces with 10,000 concurrent traces. The results are similar to the ones presented here in terms of percentage-wise performance gains and are thus omitted. This indicates that The C-CEP techniques are also scalable.

The experimental study demonstrates that significant performance gains, i.e., memory savings up to a factor of 3.5 and CPU savings at a factor of 2, are achieved through the instant approach, with a very small almost negligible overhead for optimization itself.

The system exploits constraints to optimize CEP by detecting and terminating the unsatisfiable query processing at the earliest possible time. The problem is abstracted into a query unsatisfiability problem. The runtime query unsatisfiability (RunSAT) problem and its extreme case, static query unsatisfiability (SunSAT) are defined and the incremental properties of the RunSAT checking procedure is determined. The RunSAT procedure includes two key operations, dynamic constraint derivation and RunSAT reasoning. Based on the incremental properties, the system pre-computes the query failure conditions by employing abductive reasoning. The system uses a constraint-aware CEP architecture that integrates the proposed techniques with state-of-the-art CEP techniques. The system achieves significant performance gains can be achieved through the approach, while the optimization cost is small.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for applying a query to an event stream, comprising:
   storing one or more event constraints specifying a predetermined order or occurrence of events in a stream of events ordered by timestamps, wherein the event constraints represent prior knowledge to discern event patterns that can appear in the event stream from patterns that cannot appear in the event stream;
   generating a query with one or more correlation rules representing one or more event patterns to be detected in the event stream;
   analyzing the query for query unsatisfiability using the event constraints and predicting whether upcoming events satisfy the constraints in the query;
   performing constraint aware complex event processing on the query and the event constraints by determining whether the event stream corresponds to the correlation rules in the query; and
   optimizing the query by detecting and terminating an unsatisfiable query as early as possible using the query and the event constraints,
   where the event stream can be partitioned into multiple sub-sequences based on a predetermined criteria, each partition of the event stream comprising a trace, and
   where for a query Q, event constraints C and a partial trace $h_p$, Q is said to be runtime unsatisfiable if there does not exist a trace $h_e$ that is consistent with C and contains a match to Q, where $h_p$ is prefix of $h_e$
   where event data becomes available in order of occurrences and the partial trace $h_p$ is the prefix of the trace $h_e$ and wherein the trace comprises sub-sequences of the stream of events (event history) and wherein the query Q is runtime unsatisfiable if there does not exist a remaining trace $\overline{h}_p = h_e - h_p$ that contains a match to a remaining query.

2. A system to process an event stream, comprising:
   a constraint database to store one or more event constraints specifying a predetermined order or occurrence of events in a stream of events ordered by timestamps, wherein the event constraints represent prior knowledge to discern event patterns that can appear in the event stream from patterns that cannot appear in the event stream;

a query with one or more correlation rules representing one or more event patterns to be detected in the event stream;

a constraint processor coupled to the database to perform constraint aware complex event processing on a query and the event constraints, the constraint processor analyzing the query for query unsatisfiability using the event constraints and predicting whether upcoming events satisfy the constraints in the query; and a query processor coupled to the constraint processor to optimize the query optimizing the query by detecting and terminating an unsatisfiable query as early as possible using the query and the event constraints at run time by determining whether the event stream corresponds to the correlation rules in the query, where the event stream can be partitioned into multiple sub-sequences based on a predetermined criteria, each partition of the event stream comprising a trace, and where for a query Q, event constraints C and a partial trace $h_p$, Q is said to be runtime unsatisfiable if there does not exist a trace $h_e$ that is consistent with C and contains a match to Q, where $h_p$ is prefix of $h_e$ where event data becomes available in order of occurrences and the partial trace $h_p$ is the prefix of the trace $h_e$ and wherein the trace comprises sub-sequences of the stream of events (event history) and wherein the query is runtime unsatisfiable if there does not exist a remaining trace $\overline{h_p} = h_e - h_p$ that contains a match to a remaining query.

3. The method of claim 1, comprising checking for runtime query unsatisfiability (RunSAT) using the query, one or more event constraints, and a partial event history and terminating processing of an unsatisfiable query at run time.

4. The method of claim 1, comprising identifying unsatisfiable partial query matches at runtime.

5. The method of claim 3, wherein the RunSAT considers the event query, the partial event history and the event constraints including workflows.

6. The method of claim 3, comprising improving the RunSAT performance by applying a general pre-processing mechanism to pre-compute query failure conditions.

7. The method of claim 1, comprising pre-processing the query with abductive inference.

8. The method of claim 1, comprising applying common event constraints to allow a constant time RunSAT.

9. The method of claim 1, comprising augmenting event queries with pre-computed failure conditions.

10. The method of claim 1, comprising augmenting the query with Event-Condition-Action rules encoding the pre-computed failure conditions.

11. The method of claim 1, comprising discarding an event instance if a query instance has failed.

12. The method of claim 1, comprising discarding an event instance and rejecting a query instance if the event instance causes a global failure condition.

13. A system to process an event stream, comprising:

a constraint database to store one or more event constraints specifying a predetermined order or occurrence of events in a stream of events ordered by timestamps, wherein the event constraints represent prior knowledge to discern event patterns that can appear in the event stream from patterns that cannot appear in the event stream;

a query with one or more correlation rules representing one or more event patterns to be detected in the event stream;

a constraint processor coupled to the database to perform constraint aware complex event processing on a query and the event constraints, the constraint processor analyzing the query for query unsatisfiability using the event constraints and predicting whether upcoming events satisfy the constraints in the query; and a query processor coupled to the constraint processor to optimize the query optimizing the query by detecting and terminating an unsatisfiable query as early as possible using the query and the event constraints at run time by determining whether the event stream corresponds to the correlation rules in the query, where the event stream can be partitioned into multiple sub-sequences based on a predetermined criteria, each partition of the event stream comprising a trace, and where for a query Q, event constraints C and a partial trace $h_p$, Q is said to be runtime unsatisfiable if there does not exist a trace $h_e$ that is consistent with C and contains a match to Q, where $h_p$ is prefix of $h_e$ where event data becomes available in order of occurrences and the partial trace $h_p$ is the prefix of the trace $h_e$.

14. The system of claim 13, wherein the constraint processor checks for static query unsatisfiability (SunSAT) and statically eliminates processing of an unsatisfiable query.

15. The system of claim 13, wherein the constraint processor checks for runtime query unsatisfiability (RunSAT) using the query, one or more event constraints, and a partial event history and terminating processing of an unsatisfiable query at run time.

16. The system of claim 13, wherein the constraint processor identifies unsatisfiable partial query matches at runtime.

17. The system of claim 15, wherein the RunSAT check considers the event query, the partial event history and the event constraints including workflows.

18. The system of claim 15, comprising improving the RunSAT check performance by applying a general pre-processing mechanism to pre-compute query failure conditions.

19. The system of claim 13, wherein the constraint processor comprises abductive inference.

20. The system of claim 13, wherein the query processor augments the query with Event-Condition-Action rules for encoding the pre-computed failure conditions.

* * * * *